(12) United States Patent
Hollatz et al.

(10) Patent No.: US 8,634,537 B2
(45) Date of Patent: Jan. 21, 2014

(54) METHOD OF ROUTING CALLS FROM A CONTACT CENTER

(75) Inventors: Mike Hollatz, Huntley, IL (US); Mary Ellen Moser, Warrenville, IL (US); Dave Wesen, Channahon, IL (US); Jeff Hodson, Wheaton, IL (US)

(73) Assignee: Aspect Software, Inc., Chelmsford, MA (US)

( * ) Notice: Subject to any disclaimer, the term of this patent is extended or adjusted under 35 U.S.C. 154(b) by 1893 days.

(21) Appl. No.: 10/919,166

(22) Filed: Aug. 16, 2004

(65) Prior Publication Data

US 2006/0034257 A1 Feb. 16, 2006

(51) Int. Cl.
*H04M 3/00* (2006.01)

(52) U.S. Cl.
USPC ..................... 379/265.01; 370/352

(58) Field of Classification Search
USPC ........... 370/270, 352–356; 379/265.01–266.1
See application file for complete search history.

(56) References Cited

U.S. PATENT DOCUMENTS

| | | | |
|---|---|---|---|
| 5,555,179 A | 9/1996 | Koyama et al. | |
| 5,765,033 A | 6/1998 | Miloslavsky | |
| 5,926,539 A | 7/1999 | Shtivelman | |
| 5,946,387 A | 8/1999 | Miloslavsky | |
| 5,953,332 A | 9/1999 | Miloslavsky | |
| 5,953,405 A | 9/1999 | Miloslavsky | |
| 6,002,760 A | 12/1999 | Gisby | |
| 6,021,428 A | 2/2000 | Miloslavsky | |
| 6,044,145 A | 3/2000 | Kelly et al. | |
| 6,044,368 A | 3/2000 | Powers | |
| 6,067,357 A | 5/2000 | Kishinsky et al. | |
| 6,108,711 A | 8/2000 | Beck et al. | |
| 6,138,139 A | 10/2000 | Beck et al. | |
| 6,167,395 A | 12/2000 | Beck et al. | |
| 6,170,011 B1 | 1/2001 | Beck et al. | |
| 6,175,563 B1 | 1/2001 | Miloslavsky | |
| 6,175,564 B1 | 1/2001 | Miloslavsky et al. | |
| 6,185,292 B1 | 2/2001 | Miloslavsky | |
| 6,345,305 B1 | 2/2002 | Beck et al. | |
| 6,373,836 B1 | 4/2002 | Deryugin et al. | |
| 6,389,007 B1 | 5/2002 | Shenkman et al. | |
| 6,389,132 B1 * | 5/2002 | Price | 379/265.01 |
| 6,393,015 B1 | 5/2002 | Shtivelman | |
| 6,732,156 B2 | 5/2004 | Miloslavsky | |
| 6,822,945 B2 * | 11/2004 | Petrovykh | 370/270 |
| 7,245,711 B2 * | 7/2007 | Margolis | 379/209.01 |
| 7,403,607 B2 * | 7/2008 | Hession et al. | 379/265.12 |
| 2002/0037723 A1 | 3/2002 | Roach | |
| 2002/0041590 A1 | 4/2002 | Donovan | |
| 2002/0055967 A1 * | 5/2002 | Coussement | 709/202 |
| 2002/0055975 A1 * | 5/2002 | Petrovykh | 709/205 |
| 2003/0009561 A1 | 1/2003 | Sollee | |
| 2003/0058838 A1 * | 3/2003 | Wengrovitz | 370/352 |
| 2003/0161448 A1 * | 8/2003 | Parolkar et al. | 379/88.17 |
| 2003/0235288 A1 | 12/2003 | McCormack | |
| 2004/0037268 A1 | 2/2004 | Read | |
| 2005/0047582 A1 * | 3/2005 | Shaffer et al. | 379/265.11 |

\* cited by examiner

*Primary Examiner* — Fan Tsang
*Assistant Examiner* — Akelaw Teshale
(74) *Attorney, Agent, or Firm* — Husch Blackwell LLP

(57) ABSTRACT

A method and apparatus are provided for routing calls from a contact center. The method includes the steps of providing a SIP presence server within the contact center that only provides presence information in support of outgoing calls from agents of the contact center, receiving a presence message by the SIP presence server identifying a communication port of an client and routing a call from an agent of the contact center to the client based upon the received registration message.

45 Claims, 1 Drawing Sheet

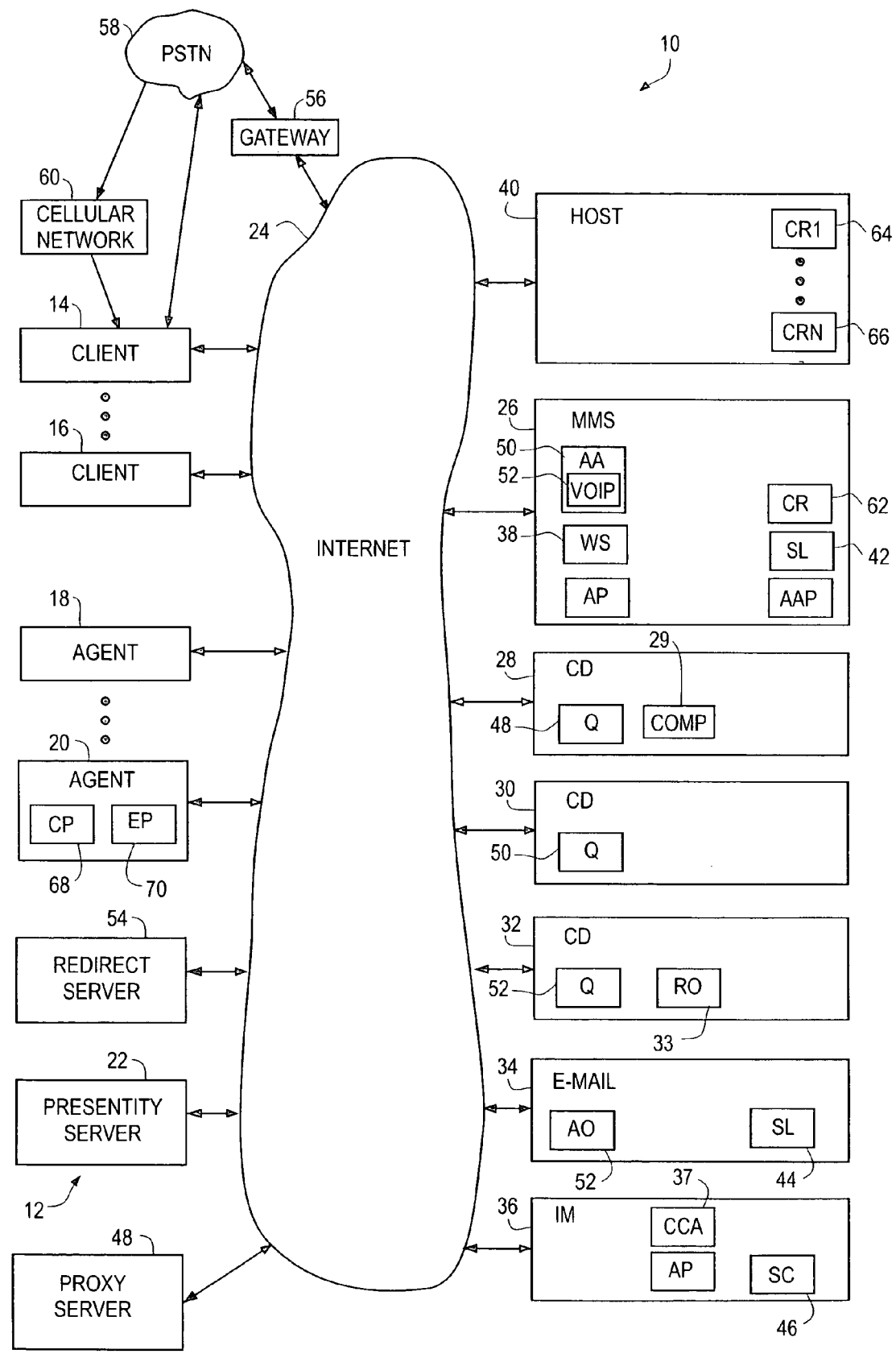

US 8,634,537 B2

METHOD OF ROUTING CALLS FROM A CONTACT CENTER

FIELD OF THE INVENTION

The field of the invention relates to computer systems and more particularly, to automatic call distributors.

BACKGROUND OF THE INVENTION

Automatic call distributors (ACDs) are known. Such systems are typically used by organizations to serve large numbers of callers through the Public Switched Telephone Network (PSTN). Typically, inbound calls are directed to a common telephone number of the organization and distributed to agents based upon some criteria (e.g., agent idle time).

In addition to handling inbound calls, ACDs may also process outbound calls. Typically, a controller monitors a workload of its agents. Where a workload of received calls falls below some threshold value, the controller may begin to initiate outbound calls.

In addition to placing and distributing calls, an ACD may also identify and display documents on agent terminals as an aid to processing the calls. In the case of incoming calls, the calls may be received along with dialed number identification service (DNIS) and/or automatic number identification (ANI) information. ANI may be used to identify a caller at the same instant as the call is delivered to the ACD. The controller of the ACD may use the ANI information to retrieve and display customer records on a terminal of the agent selected to handle the call at the same instant that the call is delivered to the agent.

In addition, textual information may be displayed on a terminal of the agent that guides the agent through a sales presentation. DNIS information may be used to identify an intended call target and to select an appropriate sales presentation for use by the agent based upon the intended call target.

While automatic call distributors work relatively well, they are not particularly well suited to handling calls involving the Internet. Further, the standards that are used for processing switched circuit calls through the PSTN cannot be used within the Internet. In addition, calls routed through the Internet may be initiated from where ever a user gains access to the Internet. Because of the additional complexity of the Internet, a need exists for a method of detecting and tracking callers that does not differentiate between calls originating from the PSTN or the Internet.

SUMMARY

A method and apparatus are provided for routing calls from a contact center. The method includes the steps of providing a SIP presence server within the contact center that only provides presence information in support of outgoing calls from agents of the contact center, receiving a presence message by the SIP presence server identifying a communication port of an outside user and routing a call from an agent of the contact center to the outside user based upon the received registration message.

BRIEF DESCRIPTION OF THE DRAWINGS

FIG. 1 is a block diagram of a contact distribution system in accordance with an illustrated embodiment of the invention.

DETAILED DESCRIPTION OF AN ILLUSTRATED EMBODIMENT

FIG. 1 is a block diagram of a contact distribution system 10 shown under an illustrated embodiment of the invention. The contact distribution system may be used for connecting calls through the Internet 24 between clients 14, 16 and agents 18, 20. In general, the system 10 may be used by any of a number of different enterprise organizations (e.g., commercial, environmental, political, etc.) to advance the agenda of the enterprise.

The system 10 may include a number of computer resources 26, 28, 30, 32, 34, 36 that function to form the connections between clients 14, 16 and agents 18, 20. Also shown in FIG. 1 is a tracking system 12 that may be used to monitor and track access points used by clients 14, 16 to reach the system 10.

Access to the contact center 10 by clients 14, 16 of the organization may be provided through the Internet 14 under any of a number of different processes. In order to promulgate the agenda of the organization to its clients 14, 16, the organization may publish contact information (e.g., telephone numbers, e-mail addresses, instant message (IM) addresses or universal resource locators (URL), etc.), by advertising or otherwise, that identifies a communication path to the organization.

Under illustrated embodiments, the contact distribution system 10 may include one or more call servers 26, 34, 36 that may function to receive and initially process calls. A first server 34 may receive calls in the form of e-mails. A second server 36 may receive calls under an Instant Messaging (IM) format. A third, multi-mode server 26 may receive telephone calls or other multi-mode calls originating from one or more webpages downloaded to clients 14, 16 from a website 38 of the multi-mode server 26.

In the case where the organization is a manufacturer with many different products, a different e-mail address may be provided for each different product line. As such, the e-mail server 34 may receive e-mails directed to many different addresses that are all within one or more domain names used by the e-mail server 34. The use of different destination addresses may be used to provide the system 10 with a first level indication of the call type of the received call. The IM server 36 and multi-mode server 26 may be used in a similar manner.

Calls processed by the servers 26, 34, 36 may be initiated in any of a number of different ways. For example, a call from a client 14, 16 to the multi-mode server 26 may be initiated by dialing a telephone number through a POTs phone, cell phone or Internet phone or by activation of a SPEAK WITH AGENT softkey on a webpage downloaded from the website 38 of the multi-mode server 26. Alternatively, calls from clients 14, 16 may be initiated in response to pop-up ads posted to websites visited by clients 14, 16. Calls may also be initiated conventionally by a client 14, 16 activating an appropriate application (e.g., Outlook by Microsoft) and entering a Universal Resource Locator (URL) of the organization under an e-mail or IM format in response to a printed ad in a newspaper or magazine.

In each case, a call to the system 10 may result in an immediate connection to an agent 18, 20. If an agent 18, 20 is not available for immediate connection, then the system 10 may respond to the client 14, 16 with an acknowledgement of the call and the option of selecting how a return call is to be accomplished. The selection of how a return call is to be accomplished results in changes within the tracking system 12 that allows agents 18, 20 to automatically find a particular client 14, 16 where ever the client 14, 16 chooses to receive return calls.

In general, calls from clients 14, 16, received by the servers 26, 34, 36 may be distributed to agents 18, 20 through a number of call distributors 28, 30, 32. As the calls arrive, the server 26, 34, 36 receiving the call may open a record 62 for each call, identified by a unique call identifier. The record may include at least a source identifier (e.g., telephone number, an e-mail address, URL, etc.) of the client 14, 16 originating the call and a destination identifier that identifies the call destination (e.g., telephone number, e-mail address, URL, etc.) within the system 10. In the case of calls received by the multi-mode server 26, information regarding any webpages visited may also be included within the call record.

A copy of each call record may be transferred to the host 40. Within the host 40, the information within the call record may be used to identify further information about the caller. For example, the source identifier may be used to identify pre-existing clients 14, 16 and also to classify the call as originating from existing or new customers. Information on webpages visited or on prior contacts with the client 14, 16 may also be used as information to determine the type of call involved.

If a caller is identified as being a pre-existing client, then any information of a current call may be added to an existing client record 64 within the host 40. If the call is determined to be from a new client, then a new customer record 66 may be opened to track the activities of the new client 14, 16.

Any additional information about pre-existing clients regarding the call may be transferred back to the server 26, 34, 36 and may be added to the record 62. Within the server 26, 34, 36, the information within the call record and, possibly, any additional information from the host 26 may be used within a call classification application 37 to further classify the call into one or more call types.

Once a call type has been determined, the server 26, 34, 36 may transfer the call to a call distributor 28, 30, 32. The call distributor 28, 30, 32 that the server 26, 34, 36 selects to handle the call may be based upon availability or upon the call type.

Selection of a contact distributor 28, 30, 32 may be based simply upon status or upon some predetermined criteria. For example, the first call distributor 28 may be associated with agents 18, 20 who are primarily skilled at handling calls of a first call type and who have secondary skills in handling calls of a second type and third call type. Similarly, the second call distributor 30 may be associated with agents 18, 20 who are primarily skilled at handling calls of a second call type and who have secondary skills in handling calls of a first type and third call type and the third call distributor 32 may be associated with agents 18, 20 who are primarily skilled at handling calls of a third call type and have secondary skills in handling calls of a first type and second call type.

As such, calls of the first call type will normally be transferred to the first call distributor 28, calls of the second call type will be transferred to the second call distributor 30 and calls of the third call type will be transferred to the third call distributor 32. However, if one or more of the call distributors 28, 30, 32 is inoperative or otherwise unavailable or is overloaded, then calls may be handled by any other call distributor 28, 30, 32.

If the primary call distributor 28, 30, 32 is available, then the server 26, 34, 36 may transfer the call along with the record to the appropriate server 28, 30, 32. Within the call distributor 28, 30, 32, a call routing application 33 may compare the contents of the call record with a list of agent skills and may assign the call to a qualified agent 18, 20. If an agent is not available, then the agent selection processor may place the call in a call queue 48, 50, 52 pending availability of a qualified agent.

For example, a client 14, 16 may dial a telephone number of the system 10. The call may be connected through the PSTN 56 and gateway 58 to an auto-attendant (AA) 50 within the multi-mode server 26. The client 14, 16 may be identified by ANI from the PSTN and a call record 62 may be created as described above.

The AA 50 may collect additional information from the caller and transfer the call to a call distributor 28, 30, 32. The call distributor may analyze the information within the record 62, select and transfer the call to an agent 18, 20. Once transferred to an agent 18, 20, a communication path may be opened between the agent 18, 20 and the client 14, 16 with the help of the tracking system 12.

In its simplest form, the tracking system 12 functions to track clients 14, 16 as clients move among communication portals (e.g., URLs, URIs, telephone numbers, etc.) within the Public Switched Telephone Network (PSTN) or the Internet 24. Tracking of clients 14, 16 by the system 12 may be accomplished through the use of a SIP presence server 22 (as defined by the Internet Engineering Task Force (IETF) RFC #3261. One difference between a conventional presence server operating under Session Initiation Protocol (SIP) and the SIP presence server 22 of the tracking system 12 is that access to the tracking system 12 is limited to agents 18, 20 of the contact distribution system 10. Other differences will become clear from the description as follows.

The use of a limited access tracking system 12 has importance in any application where it is necessary that agents 18, 20 have ready access to a user (i.e., a client 14, 16), but where it is also important that the client 14, 16 maintain his/her privacy. For example, in the case where a brokerage firm uses the contact system 10, it may be important that agents 18, 20 be able to have ready access to the client 14, 16, but the client 14, 16 is still able to keep his whereabouts and presence secret. The use of the limited access presence server 22 allows the client 14, 16 to register his presence without unauthorized parties having access to such information.

For example, in the case where the client 14, 16 accesses the website 38, or sends an e-mail to the e-mail server 34 or an instant message to the instant message server 37, the respective server 26, 34, 36 automatically registers the client's presence within the presence server 22 using a third-party SIP PRESENCE message including a portal identifier (i.e., URL, URI, telephone number, etc.) and a customer identifier and/or the unique identifier assigned by the server 26, 34, 36.

When the call is assigned to an agent 18, 20, a call processing application 68 within a terminal of the agent may retrieve the customer record 62 from the server 26, 34, 36 and the presence information (portal identifier) from the presence server 22 using a SUBSCRIBE/NOTIFY mechanism as defined by IETF RFC #3265. The call processing application 68 may then automatically open an appropriate communication channel with the client 14, 16 by forwarding the portal identifier to a proxy server 48. Opening a communication channel means activating a VoIP application if the call is a voice call or an Outlook application is the call is an e-mail or an IM application if the call is an instant message. In each case, the portal address from the presence server 22 may be prewritten into a destination address field of the activated application. Prewriting a portal address into a destination address field allows the content of the presence server 22 to control information flow in the event of multiple messages from the same client 14, 16 through different portals.

In some situations, where a client 14, 16 places a call to the contact distribution system 10, it may be necessary for the client 14, 16 to change to a different portal before a response is received from an agent 18, 20. In this case, the client 14, 16 may register his/her presence at a new portal with the presence server 22 under any of a number of different formats. For example, if the client 14, 16 had previously requested a call back under a voice format through the web server 38, then the client 14, 16 may return to the same web page and again activate the SPEAK WITH AGENT button. Activation of the SPEAK WITH AGENT button may cause the website 38 to download a contact menu to the client 14, 16 that allows the client 14, 16 to select how a return call is to be accomplished. Options within the contact menu may include voice (through gateway 56 and the PSTN 58), end-to-end VoIP, e-mail or IM. If the client 14, 16 is an existing client, then the menu options may be pre-populated with previously used portal identifiers (e.g., telephone number, e-mail address, URL, URI, etc.). The client 14, 16 may select one or more of the options or overwrite a pre-populated identifier with a new identifier.

Upon activating an enter softkey, the server 26 may transfer the contact information to the presence server 22. If this is a first call from the client 14, 16, then this may cause a new entry to be made within the presence server 22. If this were a second or later call, then the new contact information may be used to replace any previous information.

Similarly, the client 14, 16 may place a call through the PSTN 58 either from a POTS phone or cell phone to the contact distributor 10. The call may be directed through a gateway 56 to an auto-attendant (AA) 50 within the server 26. Carried along with the call may be call-associated information such as ANI information, from the PSTN, that identifies the caller.

Upon arrival of the call at the AA 50, a VoIP application 52 may be activated to service the call. The AA 50 may also open a record 62 regarding the call.

The AA 50 may present the client 14, 16 with a number of options including the option of selecting a callback option. If the client 14, 16 activates the callback option, then the AA 50 may query the client 14, 16 as to how he/she wishes to be contacted. The client may press "1" on his telephone keypad for voice, "2" for e-mail or "3" for instant messaging. If, based upon ANI information from the PSTN, the client 14, 16 can be identified from previous contacts with the system 10, then a portal identifier (i.e., telephone number, e-mail address, URI, URL, etc.) may already be available within a customer record associated with the client 14, 16. If the client 14, 16 presses "1", the AA 50 may ask the client 14, 16 if the client 14, 16 wishes to be contacted at a previously used telephone number and may recite that number. The AA 50 may instruct the client to press "1" to use the recited number or press "2" to enter another number. If the client presses "2", the AA 50 acknowledges the selection and prepares to accept the new number.

In the case of an e-mail or IM message, receipt of an e-mail or IM message by the respective server 34, 36 may result in a immediate acknowledgement of the message and a request that the client 14, 16 wait for the next available agent. The acknowledgment from the server 34, 36 may also include an invitation to the client 14, 16 to select a callback option. In this case, a menu may be provided for selection of a mode of communication. Similarly, an interactive window may be provided for entry (confirmation) of an identifier of a communication port.

In any case, once the AA 50 (or server 34, 36) receives the portal identifier, the identifier is transferred to the presence server 22 along with a client identifier. Once an agent becomes available to answer the call, the agent 18, 20 accepts the call and the agent terminal sets up the communication path as described above.

Under other illustrated embodiments, it may be necessary that an agent 18, 20 periodically contact clients 14, 16. In order to contact a client 14, 16, the agent 18, 20 may enter an identifier of the client 14, 16 through the terminal of the agent 18, 20. Entry of the identifier of the client 14, 16 may cause the terminal to retrieve records 64, 66 associated with the client 14, 16.

Upon retrieving the records 64, 66, the call processor 68 may present a CONTACT CLIENT softkey on a display of the agent's terminal. If the agent should activate the CONTACT CLIENT softkey, the call processor 68 may send a SUBSCRIBE/NOTIFY message to the presence server 22 using a client identifier that requests a most recent portal identifier of the client 14, 16. The presence server 22 may respond with a portal identifier of the client 14, 16 and, in response, the call processor 68 may set up the connection as described above.

Under an alternative embodiment of the invention, the host 40 may periodically query the presence server 22 with a SIP NOTIFY message and correlate and match any entries with customer records 64, 66. Once a match has been found, the host 40 may send a third party SIP REDIRECT message to a redirect server 54 using a customer identifier and any current portal identification information. Calls to clients 14, 16 may then be routed to the REDIRECT server 54 where, in turn, they are routed to the current portal of the client 14, 16.

A specific embodiment of a method and apparatus for tracking clients of a contact center has been described for the purpose of illustrating the manner in which the invention is made and used. It should be understood that the implementation of other variations and modifications of the invention and its various aspects will be apparent to one skilled in the art, and that the invention is not limited by the specific embodiments described. Therefore, it is contemplated to cover the present invention and any and all modifications, variations, or equivalents that fall within the true spirit and scope of the basic underlying principles disclosed and claimed herein.

The invention claimed is:

1. A method of routing calls from a contact center, such method comprising the steps of:
   providing a limited access SIP presence server within the contact center with access limited to agents of the contact center that only provides presence information in support of outgoing calls from the agents of the contact center;
   the SIP presence server receiving a SIP presence message from a communication server of the control center which registers presence information of a client identifying the client and a portal address of a communication port being used by the client of the contact center for a call, and maintaining privacy of the client presence information; and
   retrieving the client presence information from the SIP presence server automatically in response to assigning the call to an agent of the contact center; and
   routing the call from an agent of the contact center to the client based upon the received presence information by automatically forwarding the portal address to a proxy server from the SIP presence server and opening a communications channel with the client using the portal address.

2. The method of routing calls from the contact center as in claim 1 further comprising retrieving a portal address of the communication port by using a SIP SUBSCRIBE/NOTIFY message and prewriting the portal address into a destination address field of an activation application of the agent to control information flow for multiple messages from the client through different communications ports.

3. The method of routing calls from the contact center as in claim 2 wherein the client registers a new presence at a new portal with the SIP presence server replacing any prior presence information with the new presence information.

4. The method of routing calls from the contact center as in claim 2 wherein the portal address further comprises a Universal Resource Locator of the client.

5. The method of routing calls from the contact center as in claim 2 wherein the portal address further comprises a telephone number of the client.

6. The method of routing calls from the contact center as in claim 2 wherein the portal address further comprising an e-mail address of the client and wherein the communication server automatically registers the presence information of the client in the SIP presence server using a third party SIP presence message including a unique identifier assigned by the communication server.

7. The method of routing calls from the contact center as in claim 2 further comprising transferring the retrieved portal address to a proxy server of the contact center.

8. The method of routing calls from the contact center as in claim 1 further comprising transferring an identifier of the client to a redirect server of the contact center.

9. The method of routing calls from the contact center as in claim 8 wherein the step of transferring the identifier to a redirect server of the contact center further comprises a host periodically querying the SIP presence server using a SIP Notify message, and matching the presence information with a call record.

10. The method of routing calls from the contact center as in claim 9 wherein the step of the host matching the presence information with a call record further comprises the host transferring a third-party redirect message to the redirect server in response to matching the call record by sending a third party SIP redirect message to the redirect server with current client presence information and the identifier of the client and then routing the call to the redirect server which routes the call based on the current presence information.

11. The method of routing calls from the contact center as in claim 1 wherein the step of receiving the presence message further comprising coupling a server to an incoming call arriving at the contact center, detecting a source address of the outside caller, composing the presence message and forwarding the presence message to the presence server as a third-party presence message.

12. The method of routing calls from the contact center as in claim 11 wherein the server further comprises a multi-mode server, an e-mail server or an instant messaging server.

13. The method of routing calls from the contact center as in claim 11 wherein the step of coupling the server to the incoming call further comprises providing a website within the contact center for registration of a callback option by the client.

14. The method of routing calls from the contact center as in claim 11 wherein the step of coupling the server to the incoming call further comprises providing an e-mail server within the contact center for registration of a callback option by the client.

15. The method of routing calls from the contact center as in claim 11 wherein the step of coupling the server to the incoming call further comprises providing an instant message server within the contact center for registration of a callback option by the client.

16. An apparatus for routing calls from a contact center, such apparatus comprising:
a limited access SIP presence server disposed within the contact center with access limited to agents of the contact center that provides presence information in support of outgoing calls from the agents of the contact center to maintain privacy of the presence information;
means for receiving a third party SIP presence message from a communication server of the contact center which registers presence information of a client by the SIP presence server identifying the client and a portal address of a communication port of the client for a call;
means for automatically retrieving the client presence information from the SIP presence server in response to assigning the call to an agent of the contact center; and
means for routing the call from an agent of the contact center to the client based upon the received presence information by automatically forwarding the portal address to a proxy server from the SIP presence server and opening a communication channel with the client using the portal address.

17. The apparatus for routing calls from the contact center as in claim 16 further comprising a SIP SUBSCRIBE/NOTIFY message sent by the agent to the SIP presence server to retrieve a portal address of the communication port of the client and for prewriting the portal address into a destination address field of an activation application of the agent to control information flow for multiple messages from the client through different communication ports.

18. The apparatus for routing calls from the contact center as in claim 17 wherein the portal address further comprises a Universal Resource Identifier of the client.

19. The apparatus for routing calls from the contact center as in claim 17 wherein the portal address further comprises a Universal Resource Locator of the client.

20. The apparatus for routing calls from the contact center as in claim 17 wherein the portal address further comprises a telephone number of the client.

21. The apparatus for routing calls from the contact center as in claim 17 wherein the portal address further comprising an e-mail address of the client.

22. The apparatus for routing calls from the contact center as in claim 17 further comprising means for transferring the retrieved portal address to a proxy server of the contact center.

23. The apparatus for routing calls from the contact center as in claim 16 further comprising means for transferring an identifier of the client to a redirect server of the contact center.

24. The apparatus for routing calls from the contact center as in claim 23 wherein the means for transferring the identifier to a redirect server of the contact center further comprises a host retrieving the registration message and matching the registration message with a call record.

25. The apparatus for routing calls from the contact center as in claim 24 wherein the means for the host retrieving the registration message and matching the registration message with a call record further comprises the host transferring a third-party redirect message to the redirect server.

26. The apparatus for routing calls from the contact center as in claim 16 wherein the means for receiving the presence message further comprising means for coupling a server to an incoming call arriving at the contact center, means for detecting a source address of the outside caller, means for composing the presence message and means for forwarding the presence message to the presence server as a third-party presence message.

27. The apparatus for routing calls from the contact center as in claim 26 wherein the server further comprises a multi-mode server, an e-mail server or an instant messaging server.

28. The apparatus for routing calls from the contact center as in claim 26 wherein the means for coupling the server to the incoming call further comprises a website disposed within the contact center for registration of a callback option by the client.

29. The apparatus for routing calls from the contact center as in claim 26 wherein the means for coupling the server to the incoming call further comprises an e-mail server disposed within the contact center for registration of a callback option by the client.

30. The apparatus for routing calls from the contact center as in claim 26 wherein the means for coupling the server to the incoming call further comprises an instant message server disposed within the contact center for registration of a callback option by the client.

31. An apparatus for routing calls from a contact center, such apparatus comprising:
  a limited access SIP presence server disposed within the contact center with access limited to agents of the contact center that provides presence information in support of outgoing calls from the agents of the contact center;
  a call server that sends a SIP presence message to the SIP presence server which registers presence information to a client identifying a source address of a call received from a client and limits access to maintain privacy of the presence information of the client; and
  a call processor that automatically retrieves the client presence information from the SIP presence server in response to assigning the call to an agent of the contact center and that routes the call from an agent of the contact center to the client based upon the received SIP presence information by automatically forwarding the portal address to a proxy server from the SIP presence server and opening a communications channel with the client using the portal address.

32. The apparatus for routing calls from the contact center as in claim 31 further comprising a SIP SUBSCRIBE/NOTIFY message sent by the agent to the SIP presence server to retrieve a portal address of the communication port of the client and prewriting the portal address into a destination address field of an activation application of the agent to control information flow for multiple messages from the client through different communications ports.

33. The apparatus for routing calls from the contact center as in claim 32 wherein the portal address further comprises a Universal Resource Identifier of the client.

34. The apparatus for routing calls from the contact center as in claim 32 wherein the portal address further comprises a Universal Resource Locator of the client.

35. The apparatus for routing calls from the contact center as in claim 32 wherein the portal address further comprises a telephone number of the client.

36. The apparatus for routing calls from the contact center as in claim 32 wherein the portal address further comprising an e-mail address of the client.

37. The apparatus for routing calls from the contact center as in claim 32 further comprising a proxy server that connects the agent to the portal address.

38. The apparatus for routing calls from the contact center as in claim 32 further comprising a redirect server that connects the agent to the outside server.

39. The apparatus for routing calls from the contact center as in claim 38 further comprising a host that retrieves the registration message from the SIP presence server and matches the registration message with a call record.

40. The apparatus for routing calls from the contact center as in claim 39 wherein the host further comprises a redirect server that receives a third-party redirect message from the host and sets up a communication connection between the agent and the client.

41. The apparatus for routing calls from the contact center as in claim 31 wherein the means for receiving the presence message further comprising a server coupled to an incoming call arriving at the contact center that detects a source address of the outside caller, composes the presence message and forwards the presence message to the presence server as a third-party presence message.

42. The apparatus for routing calls from the contact center as in claim 41 wherein the server further comprises a multimode server, an e-mail server or an instant messaging server.

43. The apparatus for routing calls from the contact center as in claim 41 wherein the call server coupled to the incoming call further comprises a website disposed within the contact center for registration of a callback option by the client.

44. The apparatus for routing calls from the contact center as in claim 41 wherein the call server coupled to the incoming call further comprises an e-mail server disposed within the contact center for registration of a callback option by the client.

45. The apparatus for routing calls from the contact center as in claim 41 wherein the call server coupled to the incoming call further comprises an instant message server disposed within the contact center for registration of a callback option by the client.

* * * * *